UNITED STATES PATENT OFFICE.

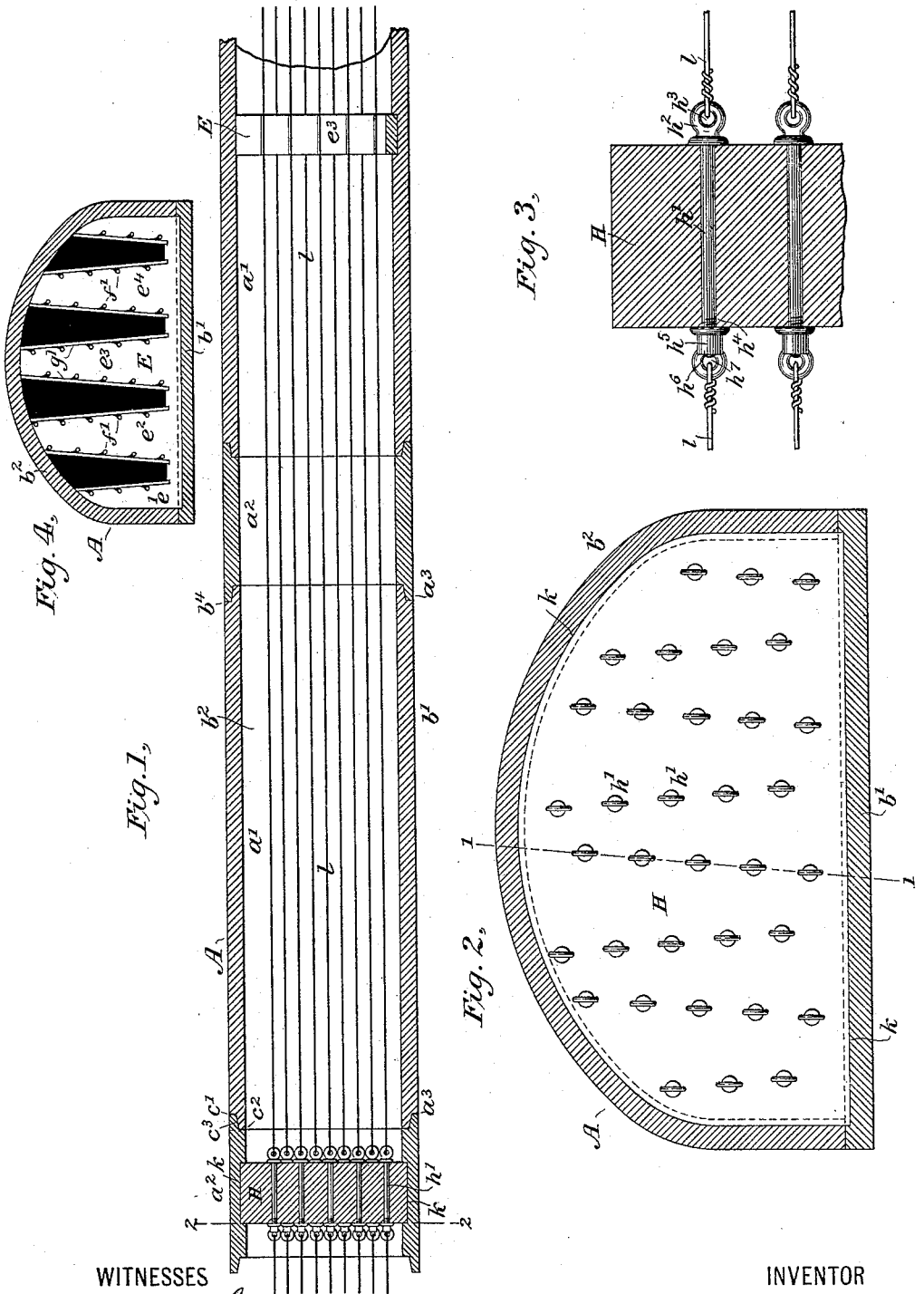

THOMAS L. SMITH, OF NEW YORK, N. Y., ASSIGNOR OF ONE-HALF TO DANIEL A. MATHEWS, OF SAME PLACE.

UNDERGROUND WIRE-CONDUIT.

SPECIFICATION forming part of Letters Patent No. 297,462, dated April 22, 1884.

Application filed February 4, 1884. (No model.)

*To all whom it may concern:*

Be it known that I, THOMAS L. SMITH, a citizen of the United States, residing in the city of New York, in the county and State of New York, have invented certain new and useful Improvements in Underground Wire-Conduits, of which the following is a specification.

My invention relates to the class of structures employed for supporting and inclosing electric conductors beneath the earth.

The invention has for its object, generally, to provide means for laying such conductors in a convenient manner, supporting them in such a manner that easy access may be had thereto for the purpose of repairing them or securing electrical connections therewith, and also to so construct the lines that separate sections may be removed or introduced without disturbing the adjacent sections, while the entire line is maintained under the proper tension to prevent neighboring conductors from touching each other.

The special object of this invention is to provide a terminal station or support, to be placed at the ends of the sections, provided with devices whereby the above objects are readily and securely attained, and the handling of the materials involving the construction of underground systems is greatly facilitated and simplified.

The invention has reference to a system which consists, generally, in forming an inclosing-conduit in sections of suitable lengths, preferably alternating long and short sections, and in placing within the longer sections supporting-bridges for the conductors, while certain of the short sections, at suitable distances apart, are provided with the solid terminal supports, hereinafter described. The bridges are preferably constructed to support the conductors in several slightly inclined series extending from the bottom of the conduit to the top, and the rigid terminal supports are provided with eyebolts of conducting material arranged in corresponding series. The ends of the separate sections of the conductors are secured to these eyebolts. These bolts extend through their supports, and are provided with suitable nuts for binding them in position, and also affording means for attaching the ends of the succeeding sections of the lines. The bolts and the nuts, being made of conducting material, serve thus to continue the connections of the line from one section of the conduit to the next section throughout its length. The thread for receiving the nut is preferably formed upon each bolt a sufficient distance to permit the sections to be tightened, after they have been attached thereto, by screwing the nut down upon the bolt. Each section of the line will thus be independently supported, and it will be held in its proper position, even though an intermediate section may by some chance become displaced.

In the accompanying drawings, Figure 1 is a longitudinal section of a conduit embodying the features of my invention, and Fig. 2 is an enlarged transverse section of the same. Fig. 3 is an enlarged view of a section of the rigid support, illustrating in detail the construction and application of the screw-bolts. Fig. 4 illustrates the form of bridge which I prefer to employ.

Referring to these figures, A represents the inclosing-wall of the conduit, which is preferably of clay, cement, or other suitable non-conducting material, and which is preferably composed of two classes of sections, as shown at $a'$ and $a^2$. The sections $a'$ are of considerably greater length than the sections $a^2$, and they form the main portion of the conduit.

One of the sections $a^2$ intervenes between the adjacent ends of every two of the sections $a'$. All of the sections of the conduit are preferably constructed in two parts—a flat bottom portion, $b'$, upon and over which fits a curved cover or top, $b^2$. The ends of the bottom portions, $b'$, of the longer sections, $a'$, preferably overlap the corresponding portions of the short sections, $a^2$, as shown at $a^3$. The upper curved portions, $b^2$, of the short sections, $a^2$, however, overlap the ends of the longer sections, $a'$, as shown at $b^4$. By reason of this construction I am enabled to lay the bottoms of both sections $a'$ and $a^2$ and the upper portions or covers, $b^2$, of the longer sections, $a'$, before finally putting the covers $b^2$ of the sections $a^2$ in place. This method of construction greatly facilitates the operation of laying the conductors. The form of joint preferred is that shown in the drawings, and consists of two vertical abutting ends, $c'$ and $c^2$, united by a longitudinal face, $c^3$. Any other suitable method of jointing may be employed.

At suitable points within the longer sections, $a'$, are placed vertical bridges E. One of these bridges is preferably placed at about the central point in each of the longer sections, $a'$, and they are preferably constructed of earthenware or other suitable non-conducting material. Each of these bridges preferably consists of a series of vertical fingers or arms, $e'$ and $e^2$, &c. The sides of each of these fingers converge toward the upper extremity, so that the notches or grooves $f'$, formed in their sides, do not fall in the same vertical lines. The notches $f'$ are placed at any suitable distance apart, and in number are as great as the number of conductors which it may be desired to place in the conduit. The conductors, when they are laid in the conduit, are supported by these notches, and for the purpose of preventing them from being accidentally displaced, suitable non-conducting plates, $g'$, may be secured against the sides of the fingers, thereby closing the grooves or notches $f'$.

Within certain of the shorter sections, $a^2$, of the conduit are placed the rigid supports H, provided with the conducting screw-bolts $h'$, to which it is designed to attach the terminals of the separate sections of conductors. The sections $a^2$ selected for this purpose are preferably at distances of, say, about one hundred feet apart, and the conductors which are to be laid are cut into sections of approximately the same length. Any length found most convenient in practical construction, depending upon the location, the amount of obstruction to travel, &c., may be employed.

The supports H preferably fit at their edges into corresponding grooves, $k$, formed in the interior of the conduit. By so constructing the parts, the supports are not only rigidly held in position, but the spaces between them form practically water and air tight compartments. This feature is of special value for preventing any moisture which may have obtained access to one compartment from passing into another.

The eyebolts $h'$ are preferably constructed in the manner more clearly shown in Fig. 3, each having a head, $h^2$, in which is formed an eye, $h^3$, for attaching one terminal of a section of a conductor, as shown at $l$. This bolt is designed to extend through the solid support H, and the end opposite the head is provided with a screw-thread, $h^4$. Upon this is fitted a nut, $h^5$, having an extended shank, $h^6$, and an eye, $h^7$, similar to the eye $h^3$. This nut is designed to be screwed tightly upon the bolt after the section of conductor attached to the eye $h^3$ has been put into place. It will be readily understood that by thus screwing the nut a greater or less distance upon the bolt the conductor will be tightened more or less. It may in some instances be desirable to make the shank $h^6$ of considerable length, so that the conductor may be attached to the eye $h^3$ while the head of the bolt is still some distance from the support H, thus permitting a considerable tension to be placed upon the wire by screwing down the nut upon the opposite end. The eyebolts $h'$ are arranged in the rigid support H, as shown in Fig. 2, in the same relative positions as are the notches or grooves $f'$ in the bridges E, so that when the conductors are attached to the screw-bolts they will be held in approximately the same relative positions. It may be found desirable to omit the bridges E from the sections $a'$ adjacent to the supports H, for the reason that the distance between the next bridge and the support H is usually insufficient to be given a support for the conductors.

The method of laying the conductors may be briefly stated as follows: The bottom portions, $b'$, of the conduits having been laid throughout any desired length, and the bridges E having been put in place, any required number of conductors, $l$, are attached to their corresponding eyebolts at one end of the section, and carried through the length of the conduit, and supported in their proper positions in the notches $f'$ of the bridges E. At the proper distance from the first support H a second support is placed, and the conductors are drawn tightly and fastened to their proper corresponding bolts, $h'$, at the second support. The nuts are then screwed upon these bolts, as may be required, for giving the conductors a greater tension than may be conveniently secured in laying and fastening them. The succeeding sections are then attached to the eyes in the nuts, and the operation is repeated. The covers or upper portions, $b^2$, of the sections of conduit may be placed in position either before the conductors are fastened in position or afterward, as found convenient. At the respective terminals of the conduit the conductors $l$ may be fastened to screw-bolts, in the same manner as at the intermediate points, or screw in any other convenient manner.

It will be readily understood that a branch conductor may be led from any one of the conductors $l$ from within the conduit to a building or other point by simply securing it to the eye of the bolt nearest that point; and, if necessary, the conductor secured to the opposite end of the same bolt may be disconnected or removed, as found desirable.

For the purpose of insuring a reliable electrical connection with the screw-bolts $h'$, the ends of the conductors $l$ may be wound about the same, and they may in addition be soldered thereto.

I claim as my invention—

1. In a conduit for electric conductors, a series of bridges for supporting the conductors, and a series of solid supports extending across said conduits and separating the same into distinct compartments, and a series of conducting rods or bolts extending through said supports, for supporting the separate sections of conductors within said conduit and placing the adjacent sections in electrical connection with each other.

2. The combination, substantially as hereinbefore set forth, with a conduit for electric conductors, of a series of supports for the conductors, which supports divide the conduit into water-tight compartments, a series of screw-bolts extending through said supports, and means for attaching sections of conductors to the respective ends of said screw-bolts, and for causing said screw-bolts to exert tension upon the sections of conductors.

3. The combination, substantially as hereinbefore set forth, of a series of sections of a conduit for electric conductors, a series of non-conducting bridges placed within the same, non-conducting plates applied to said bridges, a series of shorter sections of conduit alternating with the first-named sections, a series of rigid non-conducting supports placed within certain of the shorter sections, and means, substantially such as described, for obtaining independent electrical connections through said supports.

4. The combination, substantially as hereinbefore set forth, in an underground conduit, of a series of bridges having notches for receiving electric conductors, and a series of solid supports interposed in said series of bridges, having means, substantially such as described, for receiving the terminals of the conductors supported in said bridges, and for securing connections through the supports without changing the relative positions of the conductors.

5. The combination, substantially as hereinbefore set forth, of a series of supporting-bridges for electric conductors, having a series of upwardly-projecting tapering fingers, in the sides of which are formed notches for receiving the conductors, non-conducting plates covering said notches, and rigid supports interposed in said series of bridges, and means for securing electrical connections for the conductors through said rigid supports without changing the relative position of the conductors.

In testimony whereof I have hereunto subscribed my name this 31st day of January, A. D. 1884.

THOMAS L. SMITH.

Witnesses:
DANL. W. EDGECOMB,
CHARLES A. TERRY.